United States Patent [19]
Solka et al.

[11] Patent Number: 5,365,472
[45] Date of Patent: Nov. 15, 1994

[54] NON-LINEAR RESISTIVE GRID KERNEL ESTIMATOR USEFUL IN SINGLE FEATURE, TWO-CLASS PATTERN CLASSIFICATION

[75] Inventors: Jeffrey L. Solka, Fredericksburg; George W. Rogers; Carey E. Priebe, both of King George; Wendy L. Poston, Fredericksburg, all of Va.; Harold Szu, Bethesda, Md.

[73] Assignee: The United States of America as represented by the Secretary of the Navy, Washington, D.C.

[21] Appl. No.: 157,553

[22] Filed: Nov. 26, 1993

[51] Int. Cl.$^5$ .............................................. G06G 7/00
[52] U.S. Cl. ..................................................... 364/807
[58] Field of Search ................... 364/807, 822; 395/10, 395/20, 23

[56] References Cited

U.S. PATENT DOCUMENTS

| | | | |
|---|---|---|---|
| 4,235,516 | 11/1980 | Shreve | 350/150 |
| 4,468,093 | 8/1984 | Brown | 350/162.12 |
| 4,830,472 | 5/1989 | Mukouzaka | 350/374 |
| 5,214,744 | 5/1993 | Schweizer et al. | 364/807 |
| 5,295,091 | 3/1994 | DeWit | 364/807 |

Primary Examiner—Tan V. Mai
Attorney, Agent, or Firm—John Lewis; Jacob Shuster

[57] ABSTRACT

A discrete non-linear estimator is provided to establish a probability density function useful in classification of a feature as belonging to one of two classes. A first and second known feature space associated with respective first and second classes are each converted to a plurality of voltages reflecting corresponding first and second feature space bins. A first and second one-dimensional, non-linear resistive grid has input nodes that continuously receive the voltages reflecting the respective first and second known feature space. Each resistive grid produces an output voltage at each of a corresponding plurality of first and second output nodes. Each of a plurality of voltage comparators are used to compare voltages at corresponding first and second output nodes to output a discrete probability density function that considers corresponding ones of the first and second feature space bins. A display may be used to visually or otherwise provide each probability density function from each voltage comparator.

3 Claims, 2 Drawing Sheets

NON-LINEAR RESISTIVE GRID KERNEL ESTIMATOR USEFUL IN SINGLE FEATURE, TWO-CLASS PATTERN CLASSIFICATION

ORIGIN OF THE INVENTION

The invention described herein was made in the performance of official duties by employees of the Department of the Navy and may be manufactured, used, licensed by or for the Government for any governmental purpose without payment of any royalties thereon.

FIELD OF THE INVENTION

The invention relates generally to pattern classification, and more particularly to a non-linear resistive grid kernel estimator useful in single feature, two-class pattern classification.

BACKGROUND OF THE INVENTION

A kernel is a function used as a basis to model an underlying probability density. In existing kernel estimators used in pattern classification, a Gaussian kernel based on the function $e^{-x/2}$ is used. However, problems arise when a probability density of a feature space to be classified contains a jump discontinuity, as indicated generally by reference numeral 10 in the graph of FIG. 1. (A jump discontinuity can be thought of in this way. If a shipboard infrared sensor was scanning the horizon in a circular manner and encountered a sun glint off the water, a plot of the intensity distribution would yield a jump discontinuity at the sun glint.) The jump discontinuity poses a problem particularly if a target to be classified is near the jump discontinuity. If the Gaussian kernel estimator's window is set too wide, jump discontinuity 10 will likely be "smoothed" by a Gaussian kernel estimator. However, the target may be lost in the smoothing operation. On the other hand, if the Gaussian kernel estimator's window is set narrowly to detect jump discontinuity 10, the output of the estimator may be too noisy to detect and classify the target. Thus, the Gaussian kernel estimator cannot accurately be used in classification schemes where jump discontinuities are probable.

SUMMARY OF THE INVENTION

Accordingly, it is an object of the present invention to provide a kernel estimator useful in pattern classification when a feature space to be classified contains a jump discontinuity.

Another object of the present invention is to provide a kernel estimator useful pattern classification for single feature, two-class pattern classification.

Other objects and advantages of the present invention will become more obvious hereinafter in the specification and drawings.

In accordance with the present invention, a discrete non-linear estimator establishes a probability density function useful in classification of a feature as belonging to one of two classes. A first known feature space associated with a first class is converted to a plurality of voltages reflecting a corresponding plurality of first feature space bins. A first one-dimensional, non-linear resistive grid has input nodes that continuously receive the voltages reflecting the first known feature space. The first resistive grid produces a first output voltage at each of a corresponding plurality of output nodes. A second known feature space associated with a second class is converted to a plurality of voltages reflecting a corresponding plurality of second feature space bins. A second one-dimensional, non-linear resistive grid has input nodes that continuously receive the voltages reflecting the second known feature space. The second resistive grid produces a second output voltage at each of a corresponding plurality of output nodes. Each of a plurality of voltage comparators, such as high-gain operational amplifiers, compare corresponding first and second output voltages and output a discrete probability density function that considers corresponding ones of the first and second feature space bins. A display may be used to visually or otherwise provide each probability density function from each voltage comparator.

DETAILED DESCRIPTION OF THE INVENTION

For purposes of the present invention, a feature is some measurable quantity represented by a signal or image. For example, a measurable feature is intensity for a group of radar return signals. The intensity may be indicative of targets (class 1) or non-targets (class 2). Thus, there is a set of observations or features $(x_1, x_2, \ldots, x_n)$ that are indicative of class 1 and $(y_1, y_2, \ldots, y_m)$ that are indicative of class 2. Traditionally, the sets of features are clustered and displayed in the form of a histogram. In the present invention, feature information may be thought of as being displayed on a CRT screen as a line of N pixels $(p_1, p_2, \ldots, p_N)$. Similar to a histogram, each pixel represents a particular cluster range (lower and upper) of the features (i.e., analogous to a histogram bin) and the intensity or brightness of the pixel is proportional to the number of feature values from the data set clustered within the lower/upper range of the particular pixel.

Figure 2:
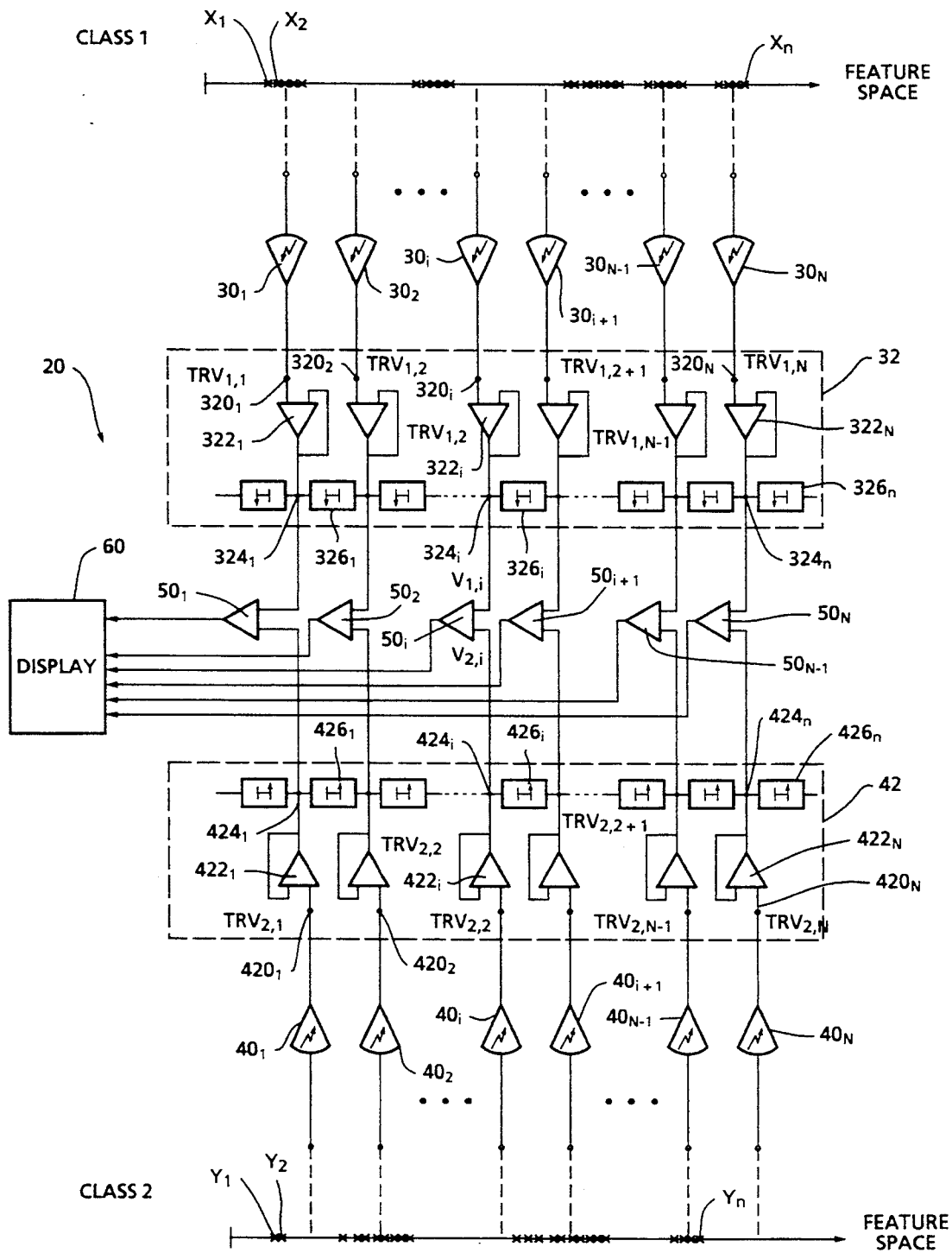
FIG. 2 is a schematic drawing of the non-linear resistive grid kernel estimator according to the present invention.

Referring now to the drawings, and more particularly to FIG. 2, a non-linear resistive grid kernel estimator is shown and referenced generally by the numeral 20. Estimator 20, configured as shown, is used to output probability density functions (PDFs) that model the distributions for the set of features $(x_1, x_2, \ldots, x_n)$ from class 1 and the set of features $(y_1, y_2, \ldots, y_m)$ from class 2. Once established, the PDFs are used jointly to classify a single unclassified feature as belonging to one of two classes, especially when the feature occurs near a jump discontinuity.

Estimator 20 includes photoresistors $30_1$–$30_N$ and $40_1$–$40_N$ to convert each of the class 1 and class 2 feature spaces (represented by N pixels for each class) to corresponding training voltages. The value of N establishes the resolution of estimator 20. The greater the value of N, the greater the resolution of each PDF which in turn improves the accuracy of the estimator as a classifier tool.

Training voltages $TRV_{1,1}$–$TRV_{1,N}$ and $TRV_{2,1}$–$TRV_{2,N}$ are input to corresponding input nodes $320_1$–$320_N$ and $420_1$–$420_N$ of a first and second one-dimensional, non-linear resistive networks or grids respectively contained within dotted line boxes referenced by numerals 32 and 42. Such networks are known in the art and are described in detail in "Analog VLSI and Neural Systems", by Carver Mead, Addison-Wesley, 1989, Chapter 7. Operation of networks 32 and 42 will be explained briefly further hereinbelow.

Training voltages $TRV_{1,1}$–$TRV_{1,N}$ reflect the clustering of features known to be "class 1" features. In other words, $TRV_{1,1}$–$TRV_{1,N}$ are training voltages that reflect the known probabilities for the entire feature space that indicate a class 1 feature. Similarly, training voltages $TRV_{2,1}$–$TRV_{2,N}$ reflect the known clustering for the entire feature space that indicate class 2 features. Training voltages $TRV_{1,1}$–$TRV_{1,N}$ and $TRV_{2,1}$–$TRV_{2,N}$ can be supplied to estimator 20 in variety of ways. For instance, if the feature space is a video image, the training voltages could be continually generated on a pixel-by-pixel basis from a video image indicative of the particular current class. Alternatively, the training voltages might originate from memory storage.

Figure 1:
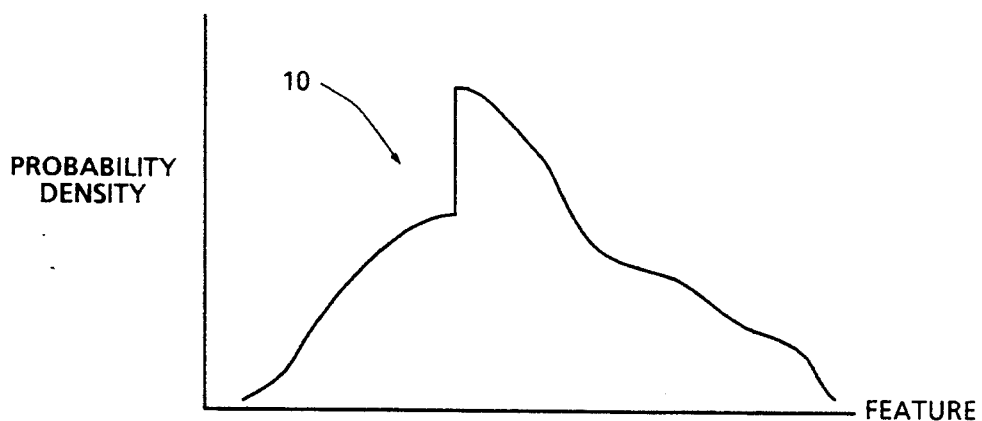
FIG. 1 is a plot of the probability density of a single feature containing a jump discontinuity in its distribution.
Figure 3:
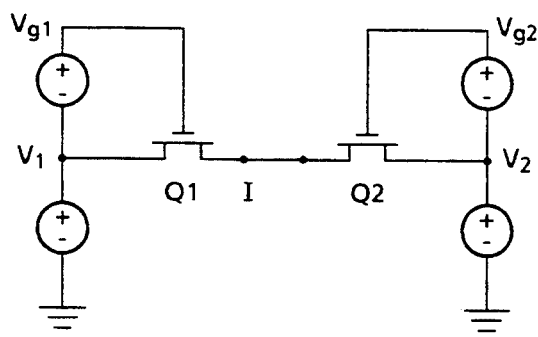
FIG. 3 is a schematic drawing of a horizontal resistance circuit used in each non-linear resistive grid.
Figure 4:
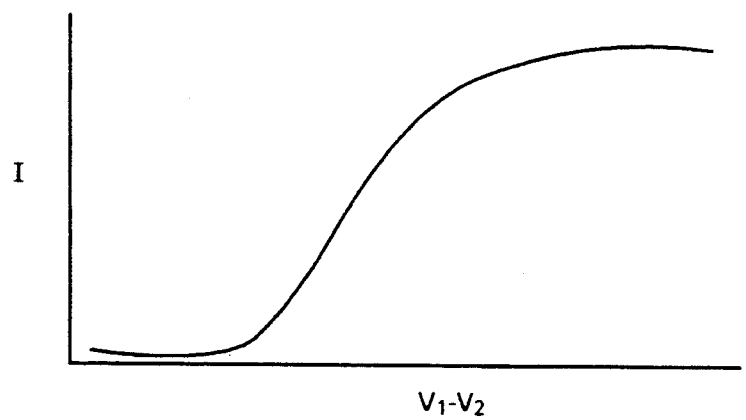
FIG. 4 is a plot of the current-voltage characteristics for the horizontal resistance circuit of FIG. 3.

Networks 32 and 42 are each follower-aggregation circuits that compute a smooth approximation to their input voltages. Each local circuit includes an input node (e.g., $320_1$) a transconductance amplifier (e.g., $322_1$), an output node (e.g., $324_1$) and a horizontal resistance (HRES) circuit (e.g., $326_1$). Each HRES circuit $326_1$–$326_N$ and $426_1$–$426_N$ may be implemented as shown in FIG. 3. Briefly, two pass transistors Q1 and Q2 form a conducting path between nodes $V_1$ and $V_2$. When $V_1$ is greater than $V_2$, Q2 limits the current I. When $V_2$ is greater than $V_1$, Q1 limits the current I. The current is linear in ($V_1$–$V_2$) for small voltage differences and saturates at high voltage differences at a value set by the gate bias voltages $V_{g1}$ and $V_{g2}$. The resulting non-linear current voltage characteristic for each HRES circuit is shown in FIG. 4.

For the non-linear operating range of each network 32 and 42, the voltage $V_i$ at the i-th output node (i.e., $324_i$ and $424_i$) is $$V_i = \frac{G_i V_i^{input} + \frac{V_{i-1}}{R_{i-1}} + \frac{V_{i+1}}{R_i}}{G_i + \frac{1}{R_{i-1}} + \frac{1}{R_i}} \quad (1)$$

where $G_i$ is the transconductance of the i-th transconductance amplifier, $R_i$ is the effective resistance of the i-th HRES circuit, and $$V_i^{input} = \beta M_i \quad (2)$$

where $\beta$ is a scaling factor controlling the degree of non-linearity of each local circuit, and M indicates the number of observations in the i-th bin of the feature. In terms of the present example, M would represent the intensity of the i-th pixel.

The effective resistance $R_i$ is $$R_i = \frac{R_o \frac{V_{i+1} - V_i}{2}}{\tanh \frac{V_{i+1} - V_i}{2}} \quad (3)$$

where $R_o$ is the zero signal resistance value for the i-th HRES circuit. Thus, the estimate of the probability density function at each i-th output node is given by normalized voltages as $$\frac{V_i}{\sum_{i=1}^{N} V_i} \quad (4)$$

Normalized voltage outputs $V_{1i}$ and $V_{2i}$ from the i-th output nodes $324_i$ and $424_i$ are voltages proportional to the probability that a feature within the corresponding i-th bin of the feature space is associated with class 1 or class 2. If normalized voltage $V_{1i}$ is greater than normalized voltage $V_{2i}$, a feature clustered in the i-th bin is more likely from class 1. Alternatively, if normalized voltage $V_{2i}$ is greater than normalized voltage $V_{1i}$, a feature clustered in the i-th bin is more likely from class 2. Accordingly, voltage outputs from corresponding pairs of i-th nodes are compared, for example, at a high-gain amplifier $50_i$ which outputs a signal to indicate that test voltage $TV_i$ is associated with either class 1 or class 2. Outputs from amplifiers $50_1$–$50_N$ may be monitored individually (i.e., on a bin-by-bin basis) or as a whole (i.e., the entire PDF) on a display 60. Thus, when an unknown feature is encountered and must be classified as either a class 1 or class 2 feature, the feature need only be properly clustered or binned to determine the feature's likely classification.

The advantages of the present invention are numerous. The estimator takes advantage of the non-linear resistive grid's ability to smoothly handle jump discontinuities. In this way, the PDFs established by the present invention overcomes the problems of a Gaussian kernel estimator.

Although the invention has been described relative to a specific embodiment thereof, there are numerous variations and modifications that will be readily apparent to those skilled in the art in the light of the above teachings. It is therefore to be understood that, within the scope of the appended claims, the invention may be practiced other than as specifically described.

What is claimed as new and desired to be secured by Letters Patent of the United States is:

1. A device for establishing a probability density function useful in classification of a feature as belonging to one of two classes, comprising:

first means for converting a first known feature space associated with a first class to a plurality of voltages reflecting said first known feature space at a corresponding plurality of first feature space bins;

a first one-dimensional, non-linear resistive grid having a first plurality of input and output nodes, each of said first plurality of input nodes continuously receiving said plurality of voltages reflecting said first known feature space, wherein said first resistive grid produces a first output voltage at each of said first plurality of output nodes;

second means for converting a second known feature space associated with a second class to a plurality of voltages reflecting said second known feature space at a corresponding plurality of second feature space bins;

a second one-dimensional, non-linear resistive grid having a second plurality of input and output nodes, each of said second plurality of input nodes continuously receiving said plurality of voltages reflecting said second known feature space, wherein said second resistive grid produces a second output voltage at each of said second plurality of output nodes;

a plurality of voltage comparators, each of said plurality of voltage comparators for comparing said first and second output voltages from corresponding ones of said first and second plurality of output nodes, wherein each of said plurality of voltage comparators outputs a discrete probability density function that considers corresponding ones of said plurality of said first and second feature space bins; and means for displaying each said probability density function from each of said plurality of voltage comparators.

2. A device as in claim 1 wherein said known feature space is represented in the optical spectrum and said means for converting is a photoresistor.

3. A device as in claim 1 wherein each of said plurality of voltage comparators is a high-gain operational amplifier.

* * * * *